US005737031A

United States Patent [19]
Tzidon et al.

[11] Patent Number: 5,737,031
[45] Date of Patent: Apr. 7, 1998

[54] SYSTEM FOR PRODUCING A SHADOW OF AN OBJECT IN A CHROMA KEY ENVIRONMENT

[75] Inventors: Aviv Tzidon, Azur; Dekel Tzidon, Ramat Hagolan, both of Israel

[73] Assignee: RT-SET, Herzelia, Ill.

[21] Appl. No.: 688,300

[22] Filed: Jul. 30, 1996

[51] Int. Cl.$^6$ ............................................. H04N 9/75
[52] U.S. Cl. ............................................. 348/587; 348/592
[58] Field of Search ............................................. 348/586, 587, 348/590, 591, 592, 593; H04N 9/74, 9/75

[56] References Cited

U.S. PATENT DOCUMENTS 5,400,081  3/1995  Chaplin .................................. 348/587
5,459,529  10/1995  Searby .................................. 348/586
5,500,684  3/1996  Uya .................................. 348/586

*Primary Examiner*—Sherrie Hsia
*Attorney, Agent, or Firm*—Schwegman, Lunberg, Woessner & Kluth, P.A.

[57] ABSTRACT

A video system is described which creates a virtual shadow of a foreground object filmed in front of a blue screen with a main video camera. The virtual shadow is created using a second video camera located as a virtual light source. Images from both cameras are processed by a chroma keyer to separate the foreground object. The video image from the second camera is processed to create the virtual shadow and both video images are combined with background image. Object location and actor prompting systems are described.

18 Claims, 9 Drawing Sheets

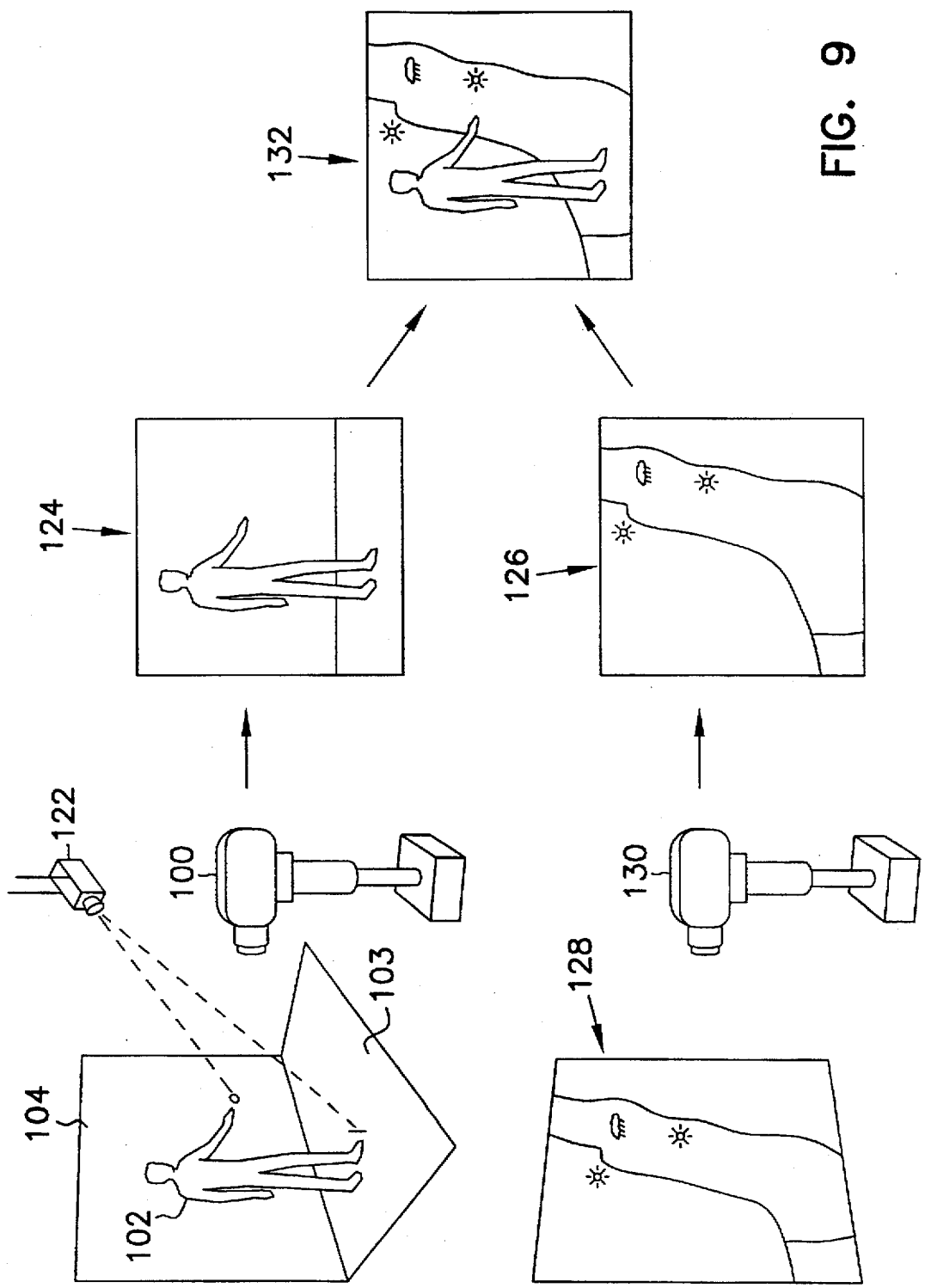

SYSTEM FOR PRODUCING A SHADOW OF AN OBJECT IN A CHROMA KEY ENVIRONMENT

FIELD OF THE INVENTION

The present invention pertains generally to chroma key technology and in particular to a system that realistically integrates the background and foreground in the chroma key studio.

BACKGROUND OF THE INVENTION

Chroma-keying and virtual set technology enable actors in a studio to appear as if they are in a more complex environment. Using this technology, scenes comprised of a number of sources, such as live video and computer graphics can be created and combined together.

In many television programs which are broadcast from television studios, live video is combined with backgrounds which were prepared in advance. This technology is called "chroma-key". The backgrounds used in this technology can be still photographs, videotape, computer generated graphics, or any other picture.

The actor (the newscaster, weather forecaster, etc.) stands in front of a plain blue screen in the studio. The television camera shoots both the actor (live video) and the blue screen. The resulting picture is then transferred to a chroma-keyer, for processing. At the same time, a background picture from a different source (such as another camera, pre-taped video or computer graphics) is transferred to the chroma-keyer.

Both pictures, the live and the background picture, are combined in the chroma-keyer and broadcast as one picture which shows the live video on the background. For example, the final result can be a weather-forecaster standing in front of a weather map which cannot be seen at all in the physical studio.

The chroma-keyer can differentiate between the live video and the blue background, according to the pixels. Wherever a pixel from the live video is identified, it is transferred to the combined broadcast picture. Wherever a pixel from the blue screen is identified, the appropriate pixel from the background is placed into the broadcast picture. In this way, a new picture is created and broadcast, using the background which was chosen.

One of the most difficult problems with chroma key technology is making the background and the foreground appear integrated. Although actors (the foreground) stand on the studio floor correctly, it looks as if they are separated from the background. The best way to convince a viewer that these two layers are connected is the use of a shadow. Because the shadow has the contour of the foreground and moves with it, the foreground and background appear to be a continuous scene.

The current method to achieve a shadow with the chroma key depends upon the use of a strong light source to make a strong shadow of the foreground object (actors). Since shadows on a blue screen appear in a slightly different color than the blue screen itself, selecting a very narrow range of key color cuts the blue out, leaving a shadow as a semi-transparent foreground.

This method forces the use of a middle course in lighting the set and finding a precise chroma key color. That is, to get an accurate background color, the entire set must be illuminated with a strong light. The use of a strong light, however, makes the shadow of the foreground object weak. A strong contrast between the shadow and the chroma key color is desired so that the chroma keyer will not cut it off the edges of the shadow as blue background. This conflict, lighting versus chroma key ends up with a compromised poor picture.

An additional problem encountered in integrating a foreground with a virtual background is contour. The background in a virtual set is three dimensional, but the method currently used to create a shadow results in a shadow in the shape of the set used in the studio. For example, an object filmed in a blue studio without a wall will have a shadow on the studio floor. The shadow 10 obtained using a keyer, therefore, will be in the shape of the floor, see FIG. 1. If the foreground object 12 is combined with a virtual background having a wall 14, the shadow of the object will pass under the wall and destroy a realistic impression.

Additional problems encountered in video systems are locating an image of a foreground object in a composite video image and prompting actors during blue screen filming. Locating the appropriate depth, or placement, of a foreground object is necessary when a "background" image appears in front of the "foreground" in a completed video.

In a blue screen environment, the image of an actor will be placed in a virtual space, which is not visible during filming of a scene. The actor must therefore imagine the set and practice long hours in order to point in the right direction or avoid walking into virtual walls, people and other objects which are part of the set.

For the reasons stated above, and for other reasons stated below which will become apparent to those skilled in the art upon reading and understanding the present specification, there is a need in the art for a way to integrate a foreground and background using chroma keying and a shadow, while avoiding the lighting and quality problems encountered in the current integration process. A system is needed for locating a foreground image in virtual space is needed to facilitate assembling composite videos. Finally, there is a need for a system which prompts an actor during blue screen filming.

SUMMARY OF THE INVENTION

The above mentioned problems with chroma keying and other problems are addressed by the present invention and which will be understood by reading and studying the following specification. A system and method is described which creates a synthetic shadow of a foreground object.

In particular, the present invention describes a system which uses a dedicated camera positioned as the light source to capture a foreground object's contour and generate a shadow. The shadow follows both the foreground object's contour and conforms to the shape of the virtual objects that are within the set. A virtual shadow, therefore, is generated which results in a high quality integration.

Using this system there is no need to force a shadow on the real set, solving the major problems of extreme lighting and precise chroma key color. Further, a director can decide the final shade of the shadow will be without changing the lights.

A system is also described whereby the main objects of a set can be projected on the floor or on the studio walls in real time. This enables actors to easily find their way around the set, and to focus on the virtual objects appearing in or disappearing from the studio. The projected images are either projected during blanking intervals of the camera or projected in a chroma color.

An additional system is described which uses multiple cameras to identify the location of an object in a three dimensional virtual image. The location of the object is used to determine which virtual images are located in front of the object and which virtual images are located behind the object.

BRIEF DESCRIPTION OF THE DRAWINGS

FIG. 9 shows use of the prompting system of FIG. 6 in a blue-screen studio environment.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following derailed description is, therefore, not to be taken in a limiting sense, and the scope of the present inventions is defined only by the appended claims.

The term "foreground" as used herein refers to objects which are filmed in front of a blue screen and combined with another video image. Although the objects are filmed in the foreground with respect to the blue screen, the foreground objects may ultimately be a background image in a completed video.

As explained above, chroma keying requires a foreground object, such as an actor, to be filmed in front of a plain blue screen in a studio. A video camera is used to film both the foreground object and the blue screen. The resulting picture is then transferred to a chroma-keyer, for processing. The blue background is replaced, pixel-by-pixel, with a background picture from a different source. One such source can be a computer which generates background graphics, thereby, providing a three dimensional virtual background which is substituted for the blue screen. The virtual background image is generated according to the camera position and its field of view. Thus, for each frame in the video, a current background image is calculated according to the camera position data.

To integrate a foreground object with a virtual background image, a virtual shadow of the foreground object is generated and combined with the virtual background. To generate a virtual shadow of a real object, the shadow shape and position must be known.

A second dedicated camera (shadow camera) is used to capture the shape of the foreground object. The shadow camera is positioned in the studio as a light source. That is, the second camera captures the object from the light source point of view. The image captured by the shadow camera is used by a chroma keyer to generate the shape of the virtual shadow.

By mapping each pixel of the shadow camera's output to the three dimensional virtual background, a computer program is able to project the shadow image on the background database graphics in the proper position. Since the shadow created is a synthesized shadow, the shadow intensity and transparency levels are parameters established by the computer program and therefore can be controlled by a director in real time.

Method for Combining Shadow and Background

Figure 1:
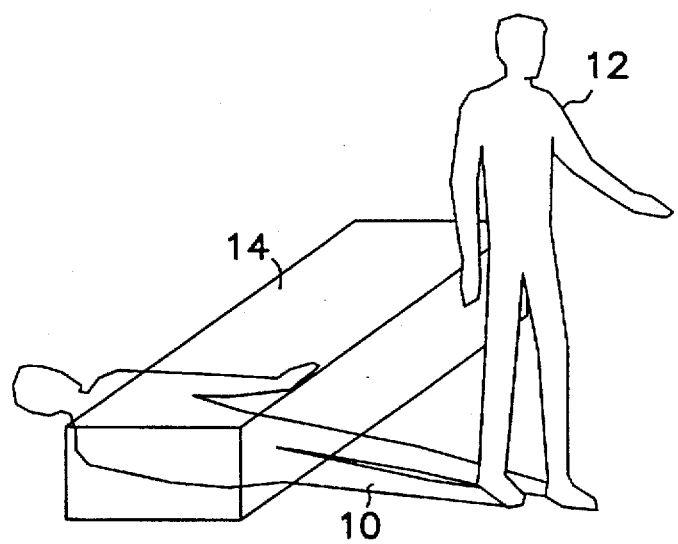
FIG. 1 is a diagram of a foreground object having a flat shadow.
Figure 2:
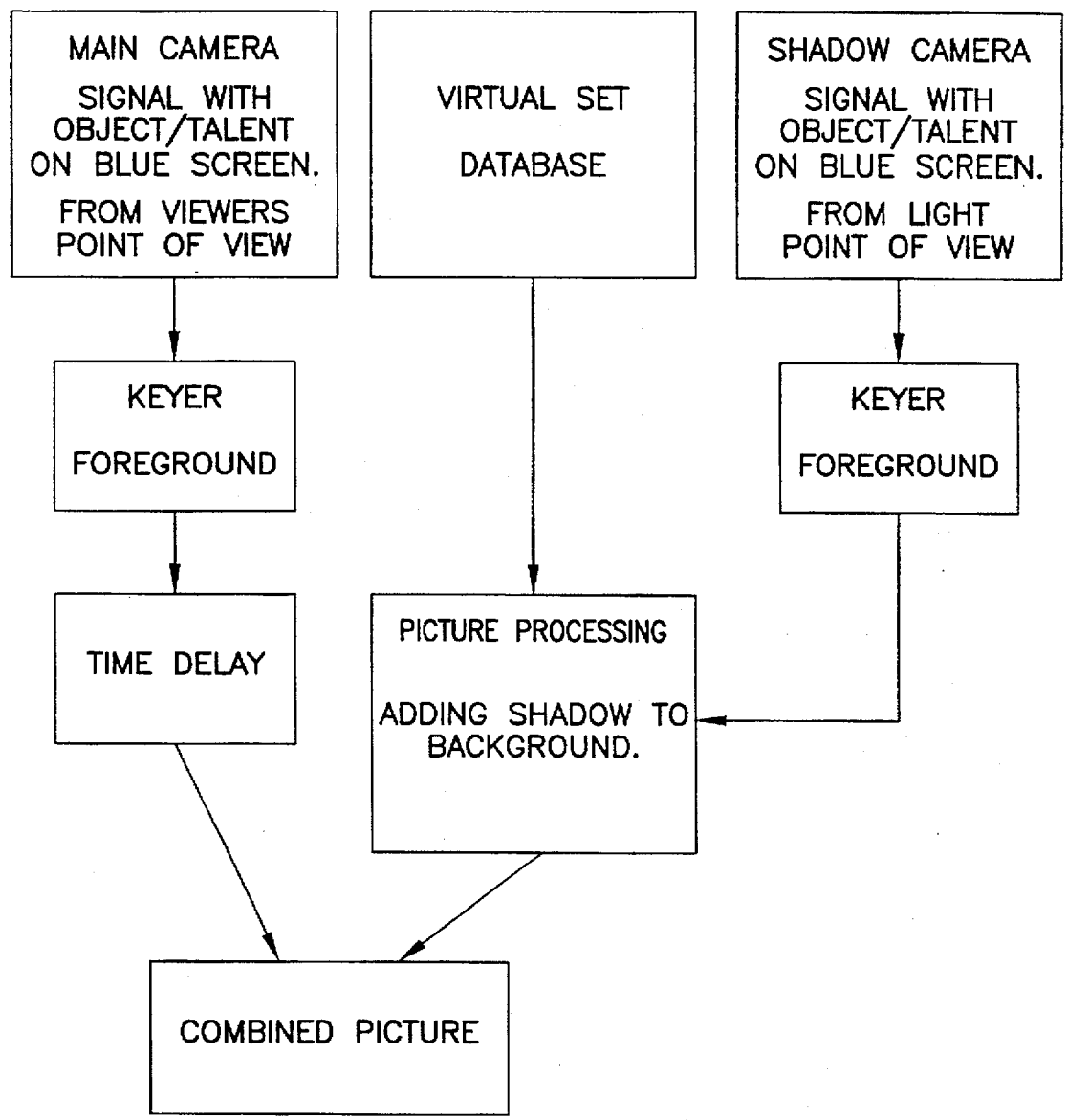
FIG. 2 is a system block diagram and process flow of the present invention.
Figure 3:
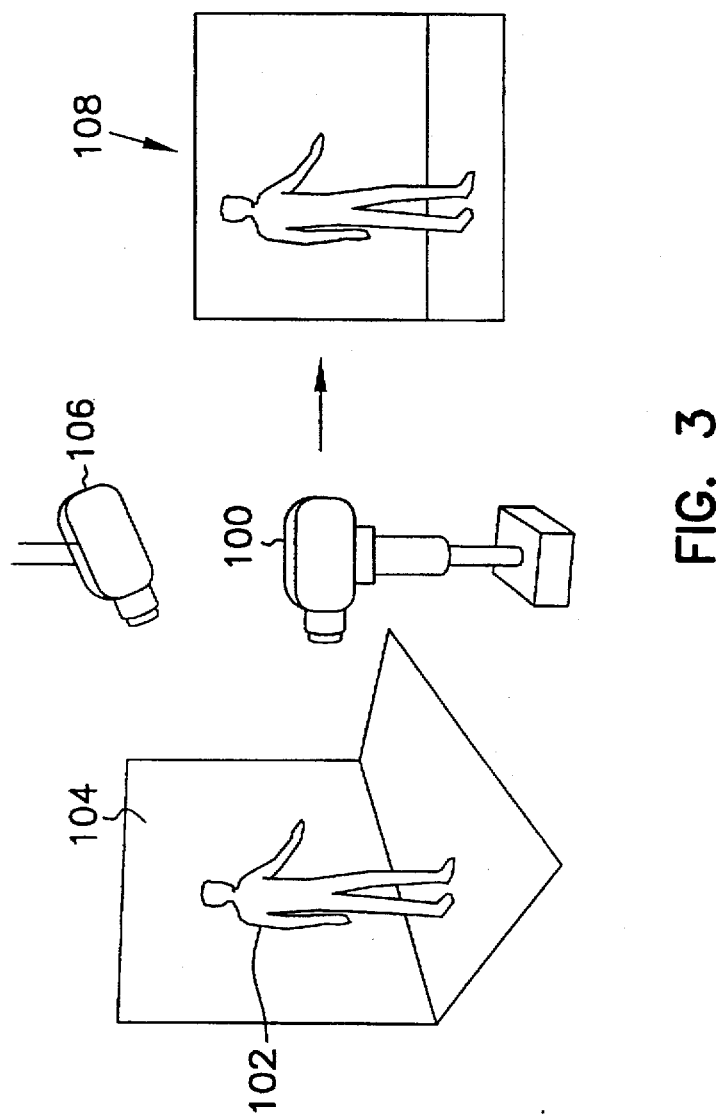
FIG. 3 is a video studio incorporating the system of FIG. 1.

FIGS. 2 and 3 illustrate the system used to create a virtual shadow with chroma keying. A main camera 100 is used to capture an image of foreground object, or talent, 102 in front of a blue screen 104. The resultant image is processed by a chroma keyer to isolate the foreground object from the blue screen and produce image 108. The foreground image is time delayed while the shadow is being generated.

Figure 4:
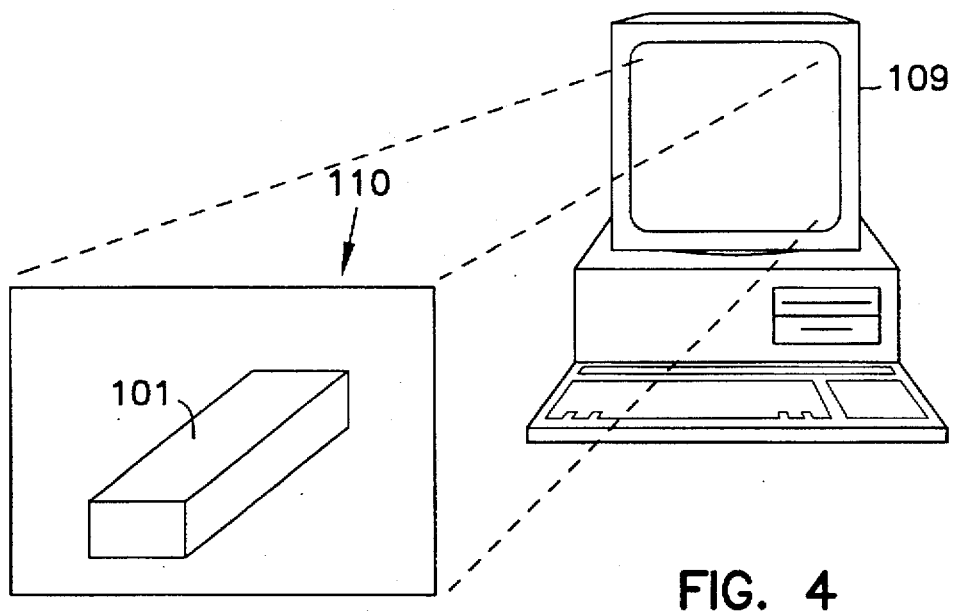
FIG. 4 is a computer and virtual background image.
Figure 5:
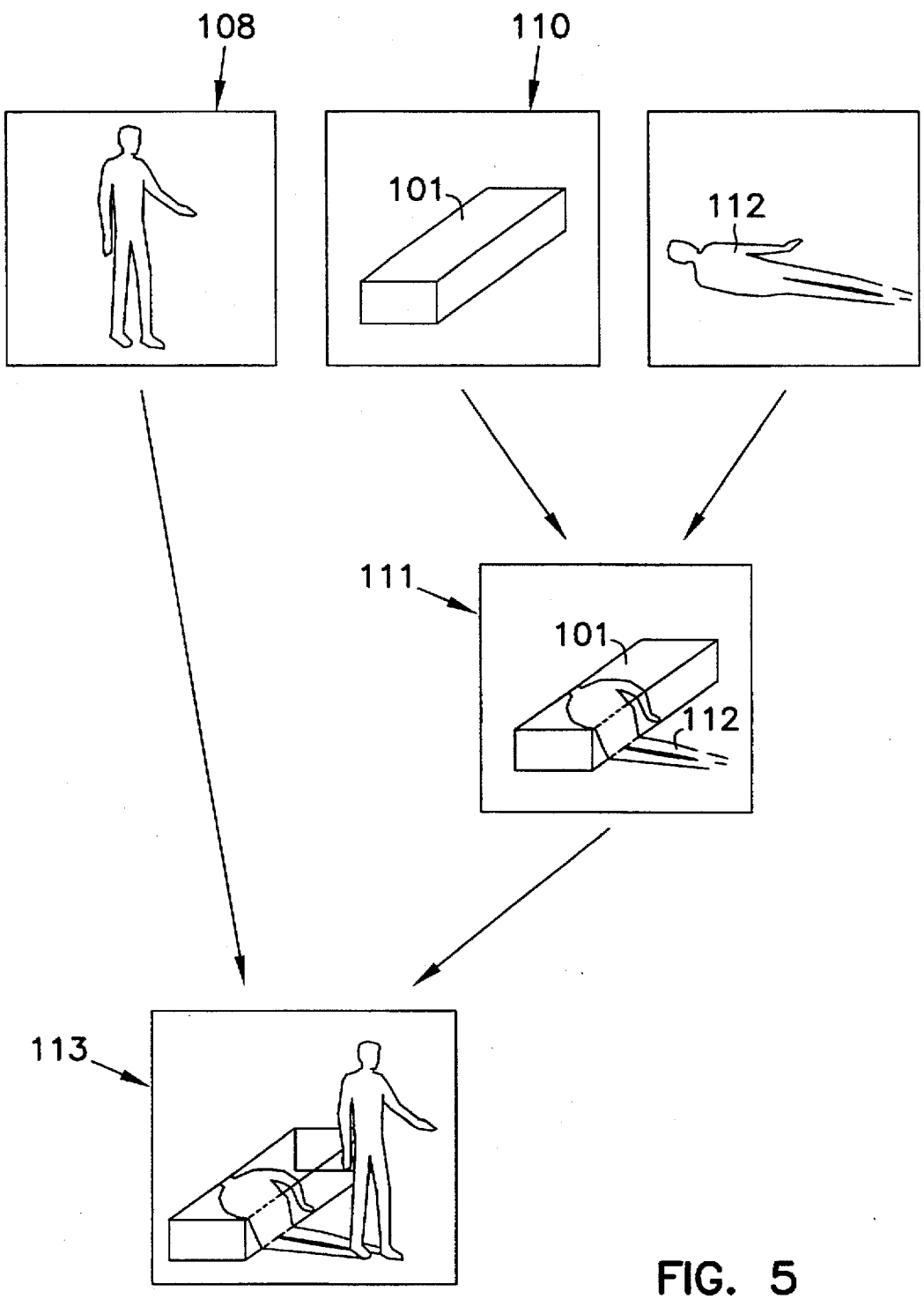
FIG. 5 is a video image of the virtual background image of FIG. 4 and a virtual shadow to create a complete image.

A virtual scene 110 is created on a computer 109 of the desired background image, see FIG. 4. This image is referred to as a virtual background or virtual set database. The image may contain a three dimensional object such as a wall 101. A shadow camera 106 is used to capture an image of the foreground object 102 in front of the blue screen 104 from the point of view of a virtual light source. The shadow camera, therefore, captures an image different than the image captured by the main camera 100. The output image from the shadow camera is processed by a chroma keyer to isolate the foreground object from the blue screen. The shadow camera's foreground image is processed with the virtual set data base to produce a completed background image 111 having both the virtual set and the virtual shadow 112, see FIG. 5. Finally, the completed background image 111 is combined with the delayed foreground image 108 as captured by the main camera 100 to produce a composite image 113.

It will be understood that the time delay of the main camera image is dependant upon the processing time required for combining the virtual shadow with the virtual set. The processing time and the time delay, however, must be synchronized so that the shadow and the foreground image match.

A video system using the virtual shadow technique described above can be combined with a system for locating images of foreground objects relative to images in a virtual scene.

Foreground Object Location

In the virtual set the terms "background" and "foreground" can be misleading, since the "background" (typically computer graphics) can appear in front of the "foreground" at times. For example, a three layer video may be created where the first layer (layer 1) consists of a computer graphics background, a second layer (layer 2) consisting of a foreground object or live video hiding parts of the first layer, and a third layer (layer 3) consisting of additional computer graphics, hiding parts of both layer 1 & layer 2. In order to accomplish this effect in real time and fully automatically, the location of the foreground object in the virtual space must be known.

Figure 6:
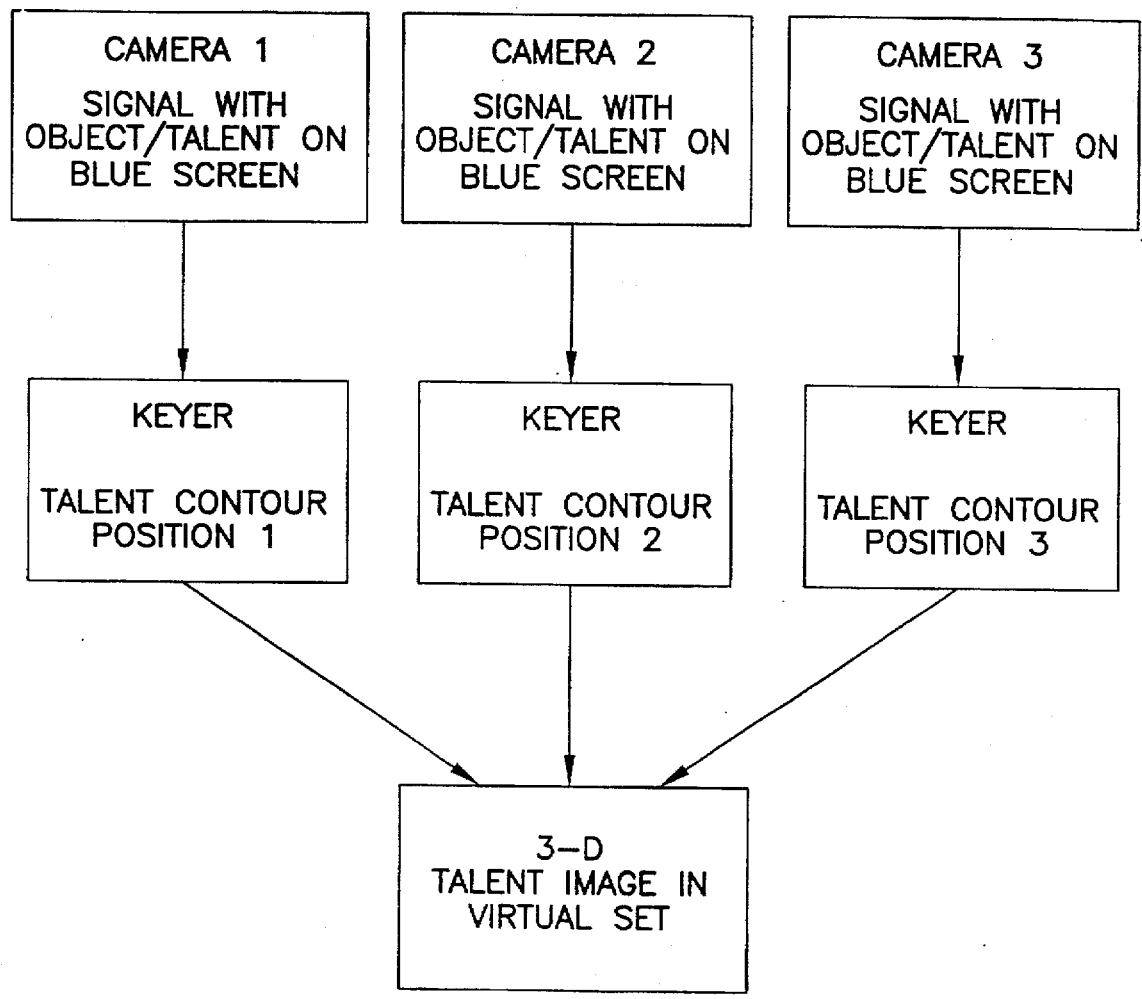
FIG. 6 is a system block diagram and process flow for locating a foreground object.
Figure 7:
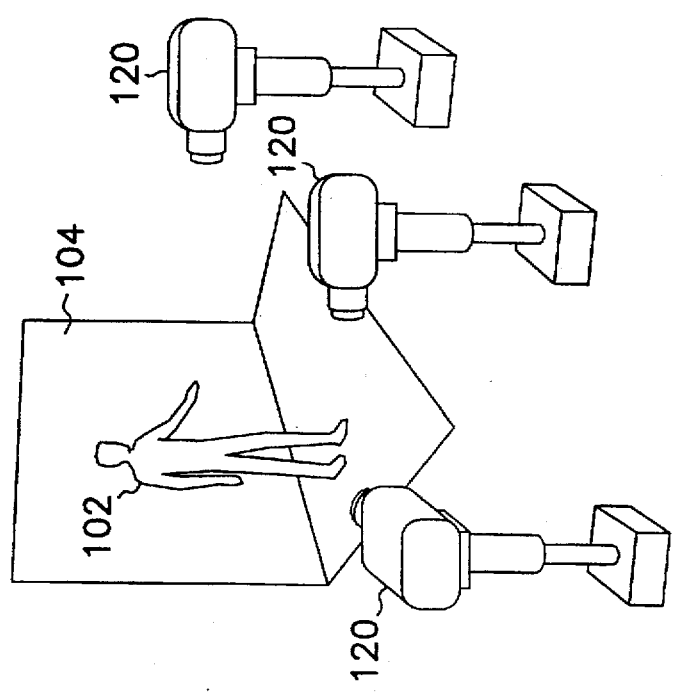
FIG. 7 is a video studio incorporating the system of FIG. 6.

A method and system are described below which provides the location, or depth, of a foreground object in the 3-D virtual world. Referring to FIGS. 6 and 7, the system includes three cameras 120 positioned in a triangle pointing to the center of the stage to capture the contour of the foreground object 102 from three different directions. A computer operating according to a program calculates the volumetric image of the foreground object and its location in the virtual space. Once the location of the foreground object in the set is known, the multiple layers of a video can be assembled in appropriate positions.

A three dimensional background image can be created according to the main camera 100 position and its field of view, see FIG. 4. That is, a virtual environment, or 3-D Set, database is created using a computer, as explained above. For each frame in the video, the current background image is calculated according to the main camera position image.

Each of the three cameras 120 see the foreground object 102 as a two dimensional image. After filtering out the blue screen background using a chroma keyer, the contour image of the foreground object remains. This shape represent the physical volume from the camera's point of view to the stage surface. Now, by utilizing the inputs of all three cameras in the triangle, the approximate location of the object within the virtual background can be obtained using the cross-section of the overlapping volumes. The cross section of the overlapping volumes represents the object volumetric image. By obtaining the object's three dimensional volumetric shape, a depth location of the object on the stage can be obtained. The depth location allows a depth value (Z value) to be assigned to each pixel of the object's image. Once the depth location of the foreground object in the set is known, it can be calculated which virtual object will appear behind the talent and which objects will appear in front.

It will be appreciated that one of the three video cameras 120 can be the main video camera 100 and that the above described shadow camera 106 can also be used as one of the two remaining cameras 120.

The video system described above, including one or both of the virtual shadow or object location can be combined with a system for prompting actors in a blue screen environment.

Actor Prompting

The video systems, as described above, can be combined with a method and apparatus to project the main objects of the virtual set in a chroma keying environment for prompting actors with audio or visual cues, as described in U.S. patent application Ser. No. 08/595,311 filed Feb. 1, 1996, entitled "PROMPTING GUIDE FOR CHROMA KEYING" and incorporated herein by reference.

Special markings are projected or screened on to the floor 103 or on the studio walls 104 in real time. This enables the actor 102 to easily find his or her way around the virtual set, and to focus his or her gaze on the virtual objects appearing in or disappearing from the studio. The markings also give the actor the timings for various events taking place in the studio.

The markings are invisible to the home viewer because they are projected in a chroma-key color. Alternatively, the special markings are completely invisible to both the first camera and to the home viewers because they are only active during blanking intervals of the video camera signals such as the vertical blanking interval or the horizontal blanking interval in an NTSC, PAL, SECAM or other video signal format. Those skilled in the art will readily recognize that the horizontal blanking and vertical blanking intervals of a television signal correspond to the retrace period for the video or television CRT in which the electron beam is repositioned to begin tracing a new line or a new field, respectively. The blanking interval is also known as the retrace time.

The method consists of first creation of the virtual scene on a computer. The prompting guide for chroma keying is used to create a virtual set on a computer using a sketch of the set and the important objects in it. The places where the actor must be found at various times are indicated in the computer model.

In use, the places where the actor must place himself at various times are projected on the floor or wall by use of a small arrow or other indicator that shows the actions about to take place. Another sign which indicates where the actor should focus his gaze (in the future, this sign will also show the actor his next line of text). All of the signs can appear with the time in which the next action or event is to take place.

All of the above signs will take place relative to the database of the set stored in the computer and synchronized with the chroma keying equipment and the video studio master synchronization signal. Transformations for the coordinates of the movable projector which projects this data on the studio walls and floor are made in order to fix the distortions which take place on the picture as a result of putting it on real objects in the studio.

The feedback to the actor can be screened in the studio with the help of a prompting device 122 which can be either a light projector, a projector and video, or a laser that is controlled by the computer. In addition, it will be possible to make this picture hidden from the viewer by the fact that the shooting will take place in full sync with the Time Code of the cameras or by the use of chroma-key colors.

TABLE 1

| Time Calculations (PAL) | |
|---|---|
| Line Blanking | 4.7 + 11.5 [μsec] |
| Line period | 63.5 |
| Field blanking | 25 line + 1 line blanking 1.6 [msec] |
| Number of fields per second | 25 |

Table 1 shows some of the timing constraints for a PAL video signal in which the video prompts are projected within the blanking intervals. High resolution laser can draw approximately 100 dots in one frame, which is enough for either small animations at different locations on the set or much larger static drawings.

Figure 8:
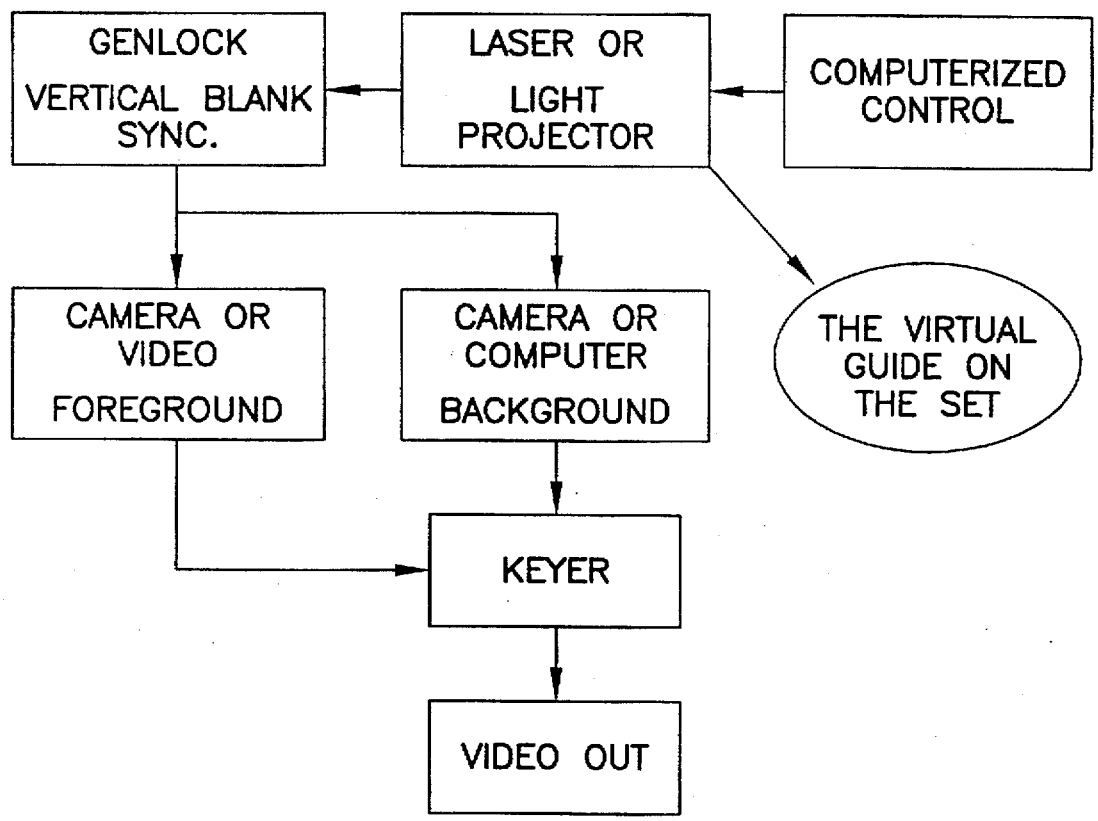
FIG. 8 shows a prompting system block diagram and process flow.

FIG. 8 shows the system block diagram. A Genlock device is used to synchronize the components to a common video signal timing. All studio cameras are synchronized to the Genlock as well as the laser or light projector. The computer generates the prompts that the projector will display or flash during the blanking interval. The foreground and background video sources are combined by the chroma keyer to produce the composite video. The resulting video will not show the prompting from the projector since the prompting only appeared during the blanking intervals. The latency of the human eye allows the actors on the set to see the flashing prompts, but the video equipment does not contain such latency so the prompts will not be picked up.

FIG. 9 shows a typical blue-screen chroma key set typically used for reporting the weather on television. The actor 102 stands before a blue screen 104 in and the prompting device 122 projects prompting images onto the floor 103 and onto the blue screen to tell the actor where to stand and point. The main video camera 100 picks up the image 124, but the image does not contain the prompts. A second background video image of a map 128 is picked up by another video camera 130 to produce a background image 126 which is combined with the foreground image 124 to produce the composite video image 132 devoid of any prompting images.

Conclusion

A system and method have been described which allow a foreground object to be integrated with a virtual background image through the use of a virtual shadow. The shadow is generated using an image captured by a shadow camera. The shadow camera is positioned with respect to the object so that an image is captured from the prospective of a light source. Using a computer, this image is synthesized with the virtual background image to provide a background image which includes a shadow of the foreground object. Generating this synthesized shadow into the virtual background gives a good link to the real object on the foreground and the best way to integrate these two layers into one image using chroma keying technology.

A system and method have been described for locating an object in a three dimensional virtual environment. The system uses three video cameras to capture a video image of an object in front of a blue screen. The images are processed by a chroma keyer to isolate the object image. The three images and the location of the cameras are used to identify where the image from the main camera is relative to virtual objects.

The video system can be combined with actor prompting techniques to provide a complete filming environment. Special markings are projected or screened on the floor or on the studio walls in real time. The special markings are projected in either a chroma-key color or are only active during virtual blanks of the camera such as the vertical blanking interval or the horizontal blanking interval in an NTSC, PAL, SECAM or other video signal format.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A system for producing a shadow of an object in a chroma key environment, comprising:
    a computer having a background image stored therein;
    a video camera positioned as a light source, the video camera producing an output signal of the object and a colored background screen; and
    a first processor for generating a shadow corresponding to the object, and producing an output image containing the background image and the shadow.

2. The system of claim 1 further comprising a main video camera, the main video camera producing a main video output signal.

3. The system of claim 2 further comprising a chroma keyer connected to the main video camera for processing the main video output signal and separating an image of the object from the colored background screen to produce therefrom a separated main video output signal.

4. The system of claim 1 further comprising a chroma keyer connected to the video camera for processing the output signal and separating an image of the object from the colored background screen.

5. The system of claim 3 further comprising a second processor for combining the separated main video output signal and the output image.

6. A video system comprising:
    a main video camera for capturing a first video image of a foreground object and a background blue screen;
    a first chroma keyer connected to the main video camera for separating the first video image of the object and the background blue screen;
    a second video camera positioned as a virtual light source for capturing a second video image of the foreground object and the background blue screen;
    a second chroma keyer connected to the second video camera for separating the second video image of the object and the background blue screen;
    a computer having a virtual background image stored therein; and
    a processor connected to the computer and the second chroma keyer for generating a virtual shadow corresponding to the object and the second video image, the processor producing composite background image comprising the virtual shadow and the virtual background image.

7. The video system of claim 6 wherein the processor is connected to the first chroma keyer and produces a composite video image of the composite background image and the separated first video image.

8. The video system of claim 6 further comprising:
    a synchronization circuit connected to the main video camera; and
    a prompting device for projecting images during a blanking interval of the first video image.

9. The video system of claim 8 where the prompting device is a laser.

10. The video system of claim 6 further comprising:
    a prompting device connected to the first chroma keyer for projecting images in a chroma keying color.

11. The video system of claim 10 where the prompting device is a laser having the chroma keying color.

12. The video system of claim 6 further comprising:
    a third video camera positioned in a location different from locations of the main video camera and the second video camera; and
    a fourth video camera positioned in a location different from the locations of the second video camera, the third video camera and the main video camera.

13. The video system of claim 12 further comprising:
    a third chroma keyer connected to the third video camera for separating a video image of the object and the background blue screen;
    a fourth chroma keyer connected to the fourth video camera for separating a video image of the object and the background blue screen;
    a location processor connected to the second, third and fourth chroma keyers for generating a location of the foreground object in the virtual background image.

14. The video system of claim 6 further comprising:
    a third video camera positioned in a location different from locations of the main video camera and the second video camera;

a third chroma keyer connected to the third video camera for separating a video image of the object and the background blue screen;

a location processor connected to the first, second and third chroma keyers for generating a location of the foreground object in the virtual background image.

15. A video system comprising:

a main video camera for capturing a first video image of a foreground object and a background blue screen;

a first chroma keyer connected to the main video camera for separating the first video image of the object and the background blue screen;

a second video camera positioned as a virtual light source for capturing a second video image of the foreground object and the background blue screen;

a second chroma keyer connected to the second video camera for separating the second video image of the object and the background blue screen;

a computer having a virtual background image stored therein;

a processor connected to the computer and the second chroma keyer for generating a virtual shadow corresponding to the object and the second video image, the processor producing composite background image comprising the virtual shadow and the virtual background image;

a prompting device connected to the first chroma keyer for projecting images in a chroma keying color;

a third video camera positioned in a location different from locations of the main video camera and the second video camera; and a fourth video camera positioned in a location different from the locations of the second video camera the third video camera and the main video camera.

16. The video system of claim 15 further comprising:

a third chroma keyer connected to the third video camera for separating a video image of the object and the background blue screen;

a fourth chroma keyer connected to the fourth video camera for separating a video image of the object and the background blue screen;

a location processor connected to the second, third and fourth chroma keyers for generating a location of the foreground object in the virtual background image.

17. The video system of claim 15 further comprising:

a third chroma keyer connected to the third video camera for separating a video image of the object and the background blue screen;

a fourth chroma keyer connected to the fourth video camera for separating a video image of the object and the background blue screen;

a location processor connected to the first, third and fourth chroma keyers for generating a location of the foreground object in the virtual background image.

18. The video system of claim 12 further comprising:

a third chroma keyer connected to the third video camera for separating a video image of the object and the background blue screen;

a fourth chroma keyer connected to the fourth video camera for separating a video image of the object and the background blue screen;

a location processor connected to the first, third and fourth chroma keyers for generating a location of the foreground object in the virtual background image.

* * * * *